Feb. 7, 1967 G. L. WHITE 3,302,928
LEVELING AND STABILIZING JACK FOR VEHICLES
Filed Feb. 15, 1965 2 Sheets-Sheet 1
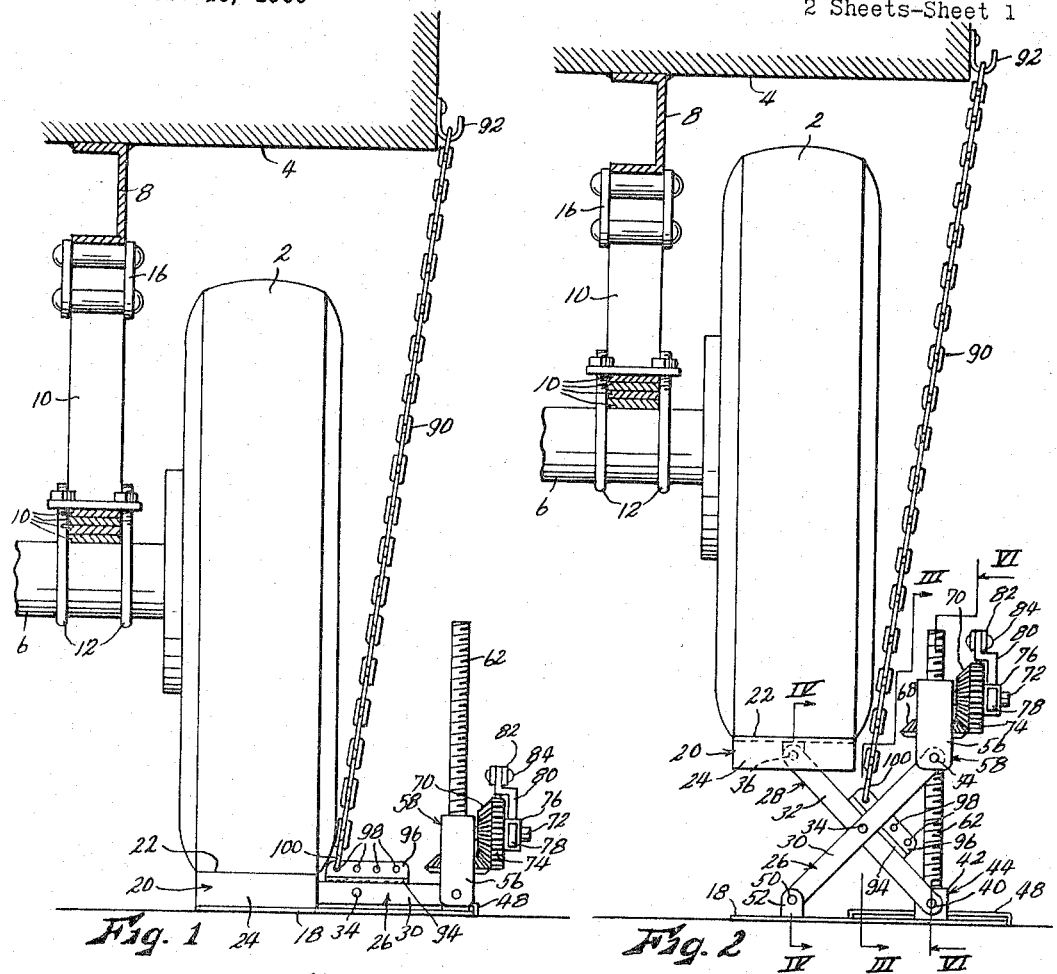
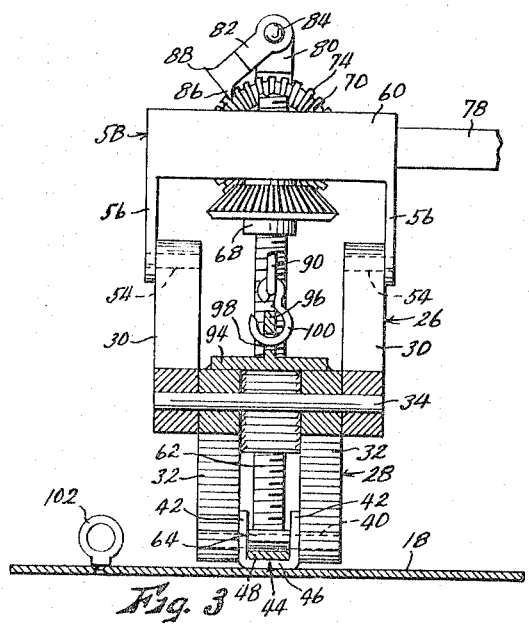
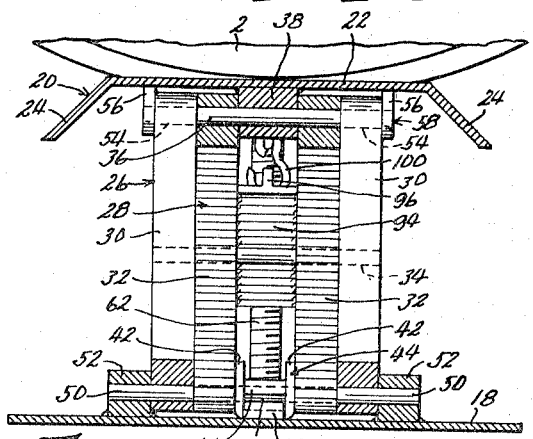
INVENTOR.
Gaylord L. White
BY John A. Hamilton
Attorney.

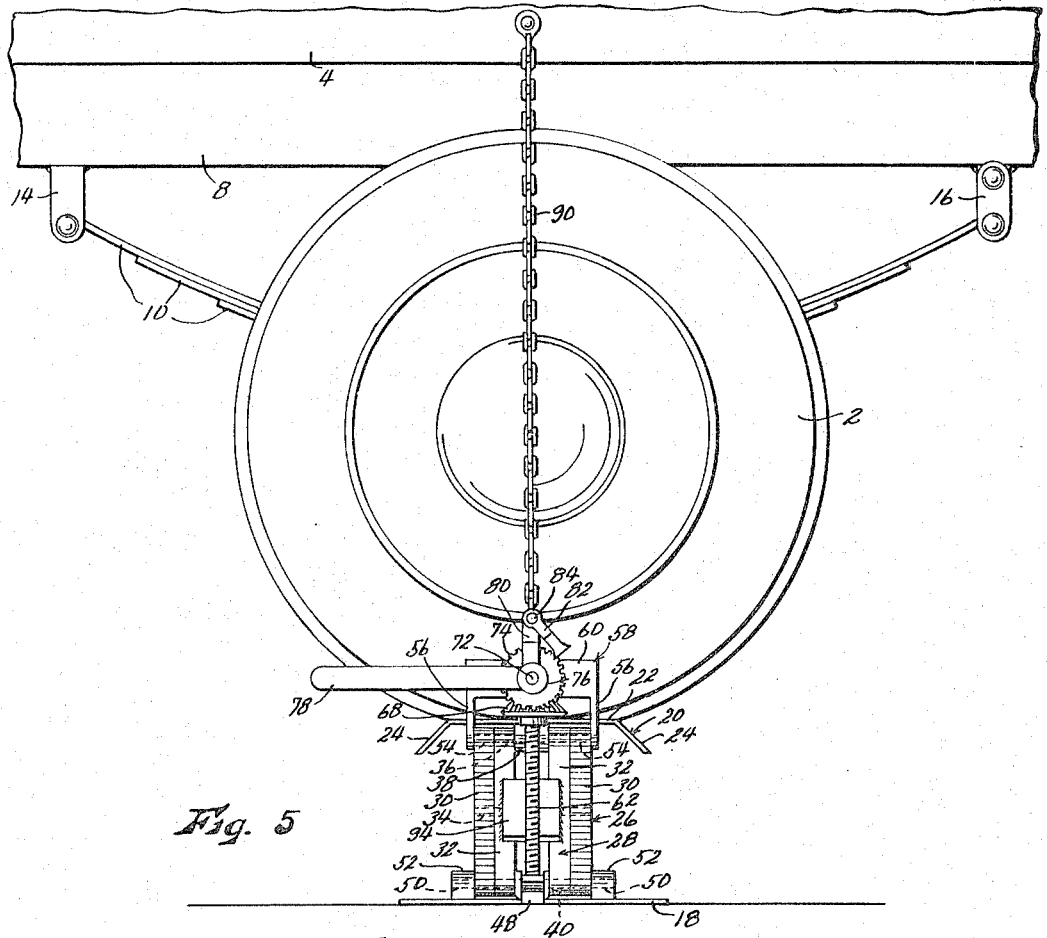
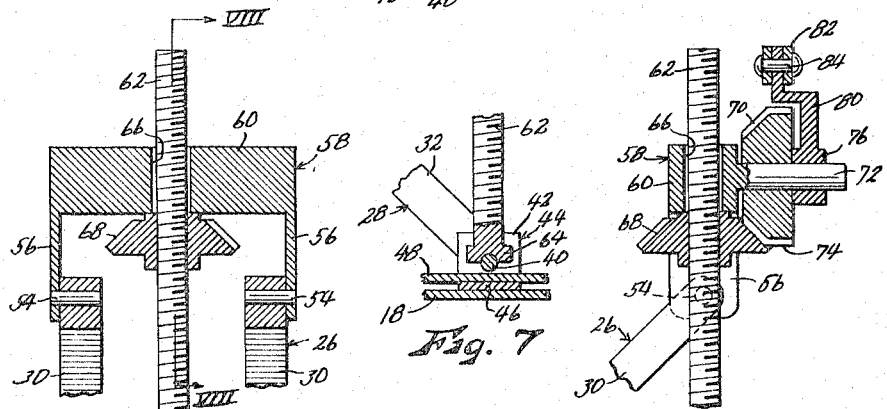
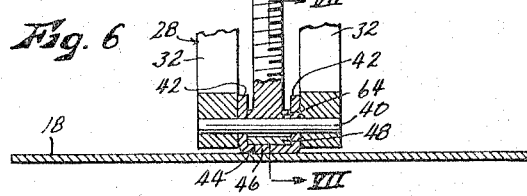

United States Patent Office 3,302,928
Patented Feb. 7, 1967

3,302,928
LEVELING AND STABILIZING JACK FOR VEHICLES
Gaylord L. White, 717 2nd St., Belton, Mo. 64012
Filed Feb. 15, 1965, Ser. No. 432,631
8 Claims. (Cl. 254—122)

This invention relates to new and useful improvements in jacks for elevating automotive vehicles, and has particular reference to jacks especially adapted for use with house trailers and the like.

With certain types of mobile vehicles, such as house trailers, trucks with camper bodies, and other vehicles the interiors of which are used as living quarters, it is sometimes not possible to find level ground on which to park the vehicle, with the result that the floor of the vehicle is inclined, with resultant discomfort and inconvenience to occupants thereof. An important object of the present invention is the provision of jack devices, one of which may be positioned under each wheel, or selected wheels, of the vehicle and operated to level the vehicle body floor.

In vehicles of the type described, the body portion is also usually supported above the wheel axles by vertically yieldable suspension springs, for softness and comfort of riding. When such a vehicle is parked, its body portion often sways and jostles on said springs, as a result, for example, of the movement of persons therein or by reason of wind blowing thereagainst. This swaying or jostling is of course uncomfortable and inconvenient. Another object of the invention is, therefore, the provision of a jack device of the character described having novel means operable as the vehicle is elevated to compress the body-supporting spring thereof, in order to render them stiffer and thereby less subject to the swaying and jostling as above discussed.

Briefly, the invention may be summarized as the provision of novel construction for a jack the load platform of which may be lowered nearly to ground level to facilitate positioning of a vehicle wheel thereon, whereby the wheel and vehicle may be elevated to level the vehicle and further, in vehicles wherein the wheel is attached to the vehicle body by a vertically yieldable spring suspension, of means associated with the jack to compress said spring suspension to any desired degree as the wheel is elevated.

Other objects are simplicity and economy of construction, efficiency and dependability of operation, adaptability to be folded compactly into a small space for convenience of storage and transportion in the vehicle, and adaptability for use in a wide variety of applications.

With these objects in view, as well as other objects which will appear in the course of the specification, reference will be had to the accompanying drawing, wherein:

FIG. 1 is fragmentary transverse sectional view of a vehicle, showing a jack device embodying the present invention positioned operatively beneath one of the ground-engaging wheels thereof, but before the jack has been operated to elevate the vehicle, FIG. 2 is similar to FIG. 1, but shows the jack after it has been operated to elevate the vehicle and compress the body springs, thereof, FIG. 3 is an enlarged sectional view taken on line III—III of FIG. 2, FIG. 4 is an enlarged fragmentary sectional view taken on line IV—IV of FIG. 2, FIG. 5 is a side elevational view of the vehicle wheel, jack and related parts as shown in FIG. 2, FIG. 6 is an enlarged sectional view taken on line VI—VI of FIG. 2, with parts broken away, FIG. 7 is a fragmentary sectional view taken on line VII—VII of FIG. 6, and FIG. 8 is a fragmentary sectional view taken on line VIII—VIII of FIG. 6.

Like reference numerals apply to similar parts throughout the several views, and the numeral 2 applies to a ground-engaging wheel of a house trailer, truck with camper body, or the like, the body of the vehicle being indicated at 4. Wheel 2 is rotatably supported by an axle housing 6, and the chassis frame 8 of the vehicle body is supported above said axle housing, and above the wheel, by a spring suspension which may, for example, consist of a bundle of leaf springs 10 extending from front to rear of the vehicle, said spring leaves being affixed at their midpoints to axle housing 6 by U-bolts 12, and having their opposite ends secured to chassis 8 respectively by shackles 14 and 16, as is well understood in the art. The particular type of spring suspension is, however, not pertinent to the present invention.

The jack device forming the subject matter of the present invention includes a ground-engaging base plate 18 which may be rectangular or of any other shape desired, and formed preferably of steel, and a platform 20 also formed of sheet steel and disposed above base plate 18. Said platform has a central portion 22 which is parallel to the base plate and adapted to support wheel 2 thereon, and downwardly angled ramp portions 24 which are adapted, when the platform is lowered as in FIG. 1, to rest on and be supported by base plate 18. The vehicle may then be moved under its own power to position wheel 2 on the platform, ramps 24 facilitating this operation. It will be seen that base plate 18 extends outwardly from the side of the vehicle when the wheel is thus positioned.

Base plate 18 and platform 20 are interconnected by a scissors-type linkage consisting of a pair of arms 26 and 28. Arm 26 consists of a pair of parallel, spaced apart bars, 30, and arm 28 consists of a pair of parallel, spaced apart bars 32, all of said bars being pivotally connected together at their midpoints by pivot pin 34. Matching ends of bars 32 are connected by pivot pin 36 to a block 38 (see FIG. 4) welded centrally to the lower surface of platform 20. The opposite ends of bars 32 are connected respectively by pivot pin 40 to the upstanding legs 42 of a U-shaped cleat 44, the connecting portion 46 of which (see FIGS. 3, 6 and 7) is supported slidably on the upper surface of base plate 18. Pivots 34, 36 and 40 are parallel, and cleat 44 is held downwardly against the base plate, but permitted to slide thereon in a direction at right angles to said pivots, by an elongated guide strip 48 overlying the connecting portion 46 of the cleat and affixed at its ends to the base plate.

Matching ends of linkage bars 30 are connected respectively by pivot pins 50 to a pair of blocks 52 welded to the upper surface of base plate 18, directly beneath pivot 36. The opposite ends of bars 30 are connected respectively by pivot pins 54 to the lower ends of the side legs 56 of a yoke 58 of inverted U-shape, the horizontal connecting portion 60 of said yoke constituting a heavy bar. Pivots 34, 50 and 54 are parallel. Hence it will be seen that pivots 36 and 50 are disposed in a vertical plane coinciding with the plane of vehicle wheel 2, and that pivots 40 and 54 are disposed in a vertical plane parallel to but spaced outwardly from the plane of wheel 2.

There is provided also a vertical screw 62 having affixed to its lower end a grooved block 64 (see FIGS. 6 and 7) which rests pivotally on pivot pin 40 between the legs 42 of cleat 44. Said screw extends upwardly from said block, passing slidably through a non-threaded hole 66 (see FIGS. 6 and 8) formed therefor centrally in the connecting portion 60 of yoke 58. A nut 68 is threaded on screw 62 below yoke 58, and bears rotatably against the lower surface of said yoke. Externally, said nut constitutes an upwardly facing bevel gear, which is meshed with a second bevel gear 70 which is rotatably mounted on a stub axle 72 affixed to and extending horizontally outwardly from yoke 58. Said last named bevel gear also includes a generally cylindrical ratchet portion 74. Also pivotally mounted on stub axle 72, outwardly from bevel gear 70, is a hub 76 from which extends a radial handle 78 and a radial arm 80, the outer end portion of said arm lying in the same vertical plane as the ratchet portion 74 of the bevel gear. A ratchet dog 82 is pivoted at 84 to the outer end of arm 80, said dog being provided at its free end with a pair of teeth 86 and 88 (see FIG. 3) operable alternatively to engage the teeth of ratchet 74 by gravity. When tooth 86 is engaged, it will be seen that counter-clockwise movement of handle 78, as viewed in FIG. 3, will cause said dog to turn bevel gear 70, and hence nut 68, in one direction, while clockwise rotation of the handle will cause the dog to move inoperatively over the ratchet teeth. When the dog is flipped over to engage tooth 88 thereof with the ratchet, the operation is the same except that opposite rotation of the bevel gear and nut will result. Thus by proper setting of the dog, an oscillatory movement of handle 78 will produce intermittent rotation of nut 68 in either direction.

Also, a tensile member, characterized by chain 90, is provided for connecting the jack with the vehicle body. As shown, the upper end of the chain has a link thereof engaged over a hook 92 affixed to the vehicle body 4 directly above wheel 2. Welded to bars 32 of linkage arm 28, intermediate their ends, is a plate 94 having an upstanding flange 96 in which are formed a series of holes 98, said holes being spaced apart longitudinally of arm 28. Chain 90 is provided at its lower end with a hook 100 which may be engaged selectively in any one of holes 98.

In use, one of the jack devices as shown is placed immediately adjacent each wheel of the vehicle which must be elevated to level the vehicle body 4, either in front of or behind said wheel, with the platform 20 of each jack lowered to rest on the base plate 18 thereof. Generally, the vehicle may be parked directly across a slope, or headed directly up or down the slope, so that only the two wheels thereof at the downhill side or end thereof need be elevated for levelling. The vehicle is then driven under its own power to move the wheel or wheels 2 thereof which are to be elevated onto the platforms 20 of the jacks. The jacks may then be operated by oscillating handles 78 thereof as previously described, thereby in each jack rotating nut 68 to elevate it on screw 62, forcing yoke 58 upwardly, forcing the outer ends of linkage arms 26 and 28 vertically apart and hence elevating platform 20 above base plate 18 to elevate wheel 2 to level the vehicle. During this movement, the outer end of linkage arm 28 moves toward the inner end of arm 26 (toward pivot 50), and this is made possible by the sliding movement of cleat 44 along the base plate. However, said cleat is held positively downwardly by guide strip 48, whereby to prevent any possibility that the vehicle could fall off the jack by causing rotation of the linkage about pivot pins 50. Once the jacks have been elevated sufficiently to level the vehicle body, handles 78 and bevel gears 70 may be slipped off of stub axles 72 to minimize the likelihood of tampering by unauthorized persons. When not in use, screw 62 may be lifted off of pivot pin 40 and withdrawn from hole 66 of yoke 58, and the linkage collapsed flat as shown in FIG. 1, in order that the entire assembly may be stored conveniently for transportation in a minimum space of the vehicle.

If it is desired also that the body springs 10 of the vehicle be compressed, in order to stabilize body 4 against swaying or jostling on said springs, as discussed, chain 90 is attached as shown in FIG. 1 before the jack is elevated, hook 100 being engaged in one of holes 98, the chain then being pulled taut and a link thereof engaged over body hook 92. It will be seen that since all of holes 98 are disposed intermediate the ends of linkage arm 28, the lower end of the chain will always be elevated to some proportionately less extent than platform 20, the proportion depending upon the particular hole 98 in which hook 100 is engaged. Therefore, since the wheel 2 is raised to the full elevation of platform 20, and since the elevation of vehicle body 4 is limited to a smaller amount by chain 90, body springs 10 must be compressed, as clearly shown in FIG. 2, and the vehicle is thereby stabilized against rocking on said springs by the increased tension of said springs. The degree to which springs 10 are compressed is of course determined by the differential between the elevation of platform 20 and the particular hole 98 into which hook 100 is inserted, and can hence be pre-set for any elevation of the body by selecting the proper hole 98. For example, if the compression of springs 10 required for adequate stabilization is assumed to be constant, and a high lift is required, hook 100 should be set in a hole 98 closer to platform pivot 36. On the other hand, if only a low lift is required, hook 100 should be set in a hole 98 closer to cleat pivot 40, since the increased differential will provide the same compression of springs 10 with a lower elevation of platform 20. The compression of springs 10 could of course be still further reduced, if desired, by deliberately leaving slack in chain 90 when attaching it, or by attaching after platform 20 was partially elevated.

If only two wheels of a vehicle are elevated by jacks, then the body springs 10 at the wheels not supplied with jacks are obviously not compressed. In the event that compression of the body springs at all of the vehicle wheels is deemed necessary for the purpose of better stabilization, then each of the wheels could be equipped with a jack as described. In that event chains 90 of the jacks at the wheels at the "uphill" side of the vehicle could either be attached in the holes 98 closest to screw 62, whereby to provide maximum compression of springs 10 with minimum elevation of the body, or said chain of each jack could be attached directly to base plate 18, in which case springs 10 would be compressed with substantially no elevation of the vehicle body. FIG. 3 shows an eye 102 affixed in base plate 18 for receiving hook 100 for this purpose.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A leveling jack for automotive vehicles comprising:
   (a) a ground-engaging base plate,
   (b) a horizontal platform normally disposed above and closely adjacent said base plate, and adapted to support a ground-engaging wheel of said vehicle thereon,
   (c) a linkage consisting of a pair of arms pivotally joined together intermediate their ends on a horizontal axis, and extending horizontally in both directions from said axis, a first pair of corresponding ends of said arms being pivoted respectively to said base plate and said platform on axes parallel to said arm axis, the second pair of corresponding ends of said arms being horizontally offset from said platform, said second pair of corresponding ends of said arms being vertically spaced apart,
   (d) a cleat pivoted on the lower of said second pair of corresponding ends of said arms on an axis parallel to said arm axis, said cleat being supported slidably on said base plate for horizontal movement at right angles to said arm axis, (e) means preventing upward movement of said cleat from said base plate, and
(f) screw means interconnecting said second pair of corresponding ends of said arms and operable to force said arm ends apart.

2. A leveling jack for automotive vehicles comprising:
(a) a ground-engaging base plate,
(b) a horizontal platform normally disposed above and closely adjacent said base plate, and adapted to support a ground-engaging wheel of said vehicle thereon,
(c) a linkage consisting of a pair of arms pivotally joined together intermediate their ends on a horizontal axis, and extending horizontally in both directions from said axis, a first pair of corresponding ends of said arms being pivoted respectively to said base plate and platform on axes parallel to said arm axis, the second pair of corresponding ends of said arms being horizontally offset from said platform, said second pair of corresponding ends of said arms being vertically spaced apart,
(d) a vertical screw pivotally supported at its lower end by the lower of said second pair of corresponding ends of said arms on an axis parallel to said arm axis,
(e) a yoke member pivoted to the upper of said second pair of corresponding arm ends on an axis parallel to said arm axis, and having an aperture formed therethrough through which said screw extends slidably,
(f) a nut threaded on said screw and abutting the lower surface of said yoke member, said nut having the external form of a toothed gear,
(g) a second gear carried rotatably by said yoke and meshing with the gear teeth of said nut, and
(h) a ratchet mechanism carried by said yoke and manually operable to rotate said second gear and said nut.

3. The structure as recited in claim 2 wherein said ratchet mechanism is reversible to rotate said gear and nut selectively in either direction.

4. The structure as recited in claim 2 wherein said ratchet mechanism is readily detachable from said yoke member whereby to discourage unauthorized tampering with said jack structure.

5. A levelling jack for use in connection with automotive vehicles having a body portion interconnected with the ground-engaging wheels thereof by vertically yieldable suspension springs, said jack comprising:
(a) a ground-engaging base plate,
(b) a horizontal platform normally disposed above and closely adjacent said base plate, and adapted to support a ground-engaging wheel of said vehicle thereon,
(c) a manually operable jack mechanism interconnecting said base plate and said platform and operable to elevate the latter with respect to the former, said mechanism including a member operable as said mechanism is actuated to be elevated to a lesser extent than said platform,
(d) an elongated, vertically extending tensile member,
(e) means for attaching the lower end of said tensile member to said last named jack mechanism member, and
(f) means for attaching the upper end of said tensile member to said vehicle body.

6. A leveling jack for use in connection with automotive vehicles having a body portion interconnected with the ground-engaging wheels thereof by vertically yieldable suspension springs, said jack comprising:
(a) a ground-engaging base plate,
(b) a horizontal platform normally disposed above and closely adjacent said base plate, and adapted to support a ground-engaging wheel of said vehicle thereon,
(c) a manually operable jack mechanism interconnecting said base plate and said platform and operable to elevate the latter with respect to the former,
(d) an elongated, vertically extending tensile member,
(e) means for attaching the lower end of said tensile member to said base plate, and
(f) means for attaching the upper end of said tensile member to said vehicle body.

7. A levelling jack for use in connection with automotive vehicles having a body portion interconnected with the ground-engaging wheels thereof by vertically yieldable suspension springs, said jack comprising:
(a) a ground-engaging base plate,
(b) a horizontal platform normally disposed above and closely adjacent said base plate, and adapted to support a ground-engaging wheel of said vehicle thereon,
(c) a manually operable jack mechanism interconnecting said base plate and said platform and operable to elevate the latter with respect to the former, said mechanism including a member operable as said mechanism is actuated to be elevated to a lesser extent than said platform,
(d) an elongated, vertically extending tensile member,
(e) means for attaching the lower end of said tensile member selectively either to said base plate or to said last named jack mechanism member, and
(f) means for attaching the upper end of said tensile member to said vehicle body.

8. A levelling jack for use in connection with automotive vehicles having a body portion interconnected with the ground-engaging wheels thereof by vertically yieldable suspension springs, said jack comprising:
(a) a ground-engaging base plate,
(b) a horizontal platform normally disposed above and closely adjacent said base plate, and adapted to support a ground-engaging wheel of said vehicle thereon,
(c) a linkage consisting of a pair of arms pivotally joined together intermediate their ends on a horizontal axis, and extending horizontally in both directions from said axis, a first pair of corresponding ends of said arms being pivoted respectively to said base plate and platform on axis parallel to said arm axis, the second pair of corresponding ends of said arms being horizontally offset from said platform,
(d) screw means interconnecting said second pair of corresponding ends of said arms and operable to force said arm ends apart,
(e) an elongated, vertically extending tensile member,
(f) means for attaching the lower end of said tensile member to one of said linkage arms selectively at any of a plurality of longitudinally spaced apart points therealong, and
(g) means for attaching the upper end of said tensile member to said vehicle body.

References Cited by the Examiner

UNITED STATES PATENTS 2,704,199  3/1955  Olson _____ 254—122

FOREIGN PATENTS 1,142,101  3/1957  France.
783,810  10/1957  Great Britain.

WILLIAM FELDMAN, *Primary Examiner.*

OTHELL M. SIMPSON, *Examiner.*